(12) United States Patent
Geer

(10) Patent No.: US 9,625,089 B1
(45) Date of Patent: Apr. 18, 2017

(54) PORTABLE MEDIA HOLDING AND DISPLAY DEVICE

(71) Applicant: Justin Geer, San Antonio, TX (US)

(72) Inventor: Justin Geer, San Antonio, TX (US)

( * ) Notice: Subject to any disclaimer, the term of this patent is extended or adjusted under 35 U.S.C. 154(b) by 0 days.

(21) Appl. No.: 15/159,944

(22) Filed: May 20, 2016

Related U.S. Application Data

(60) Provisional application No. 62/165,439, filed on May 22, 2015.

(51) Int. Cl.

| | |
|---|---|
| *F16M 13/00* | (2006.01) |
| *A47K 10/20* | (2006.01) |
| *A47K 10/30* | (2006.01) |
| *A47K 10/40* | (2006.01) |
| *F16M 13/02* | (2006.01) |
| *A45F 5/00* | (2006.01) |
| *F16M 11/40* | (2006.01) |
| *A47K 10/18* | (2006.01) |
| *A47K 10/24* | (2006.01) |
| *A47K 10/32* | (2006.01) |

(52) U.S. Cl.
CPC .............. *F16M 13/02* (2013.01); *A45F 5/00* (2013.01); *A47K 10/18* (2013.01); *F16M 11/40* (2013.01); *A45F 2005/002* (2013.01); *A45F 2200/0508* (2013.01); *A45F 2200/0516* (2013.01); *A45F 2200/0525* (2013.01); *A47K 10/24* (2013.01); *A47K 10/32* (2013.01); *A47K 10/40* (2013.01); *F16M 2200/021* (2013.01); *F16M 2200/068* (2013.01)

(58) Field of Classification Search
CPC ...... A47K 10/40; A47K 10/405; A47K 10/24; A47K 10/32; A47K 10/3836; A47K 10/18; B41J 15/04; F16M 11/04; F16M 11/40; F16M 2200/021; F16M 2200/068; F16M 13/02; A45F 5/00
USPC ................... 248/176.3, 346.3, 309.1, 274.1; 242/560.2, 592, 599, 566, 580; 211/45
See application file for complete search history.

(56) References Cited

U.S. PATENT DOCUMENTS

| | | | | |
|---|---|---|---|---|
| 5,299,874 | A * | 4/1994 | DeVoe | B41J 15/04 |
| | | | | 211/45 |
| 5,690,307 | A | 11/1997 | Joyce | |
| 6,628,789 | B1 * | 9/2003 | Colby | A47K 10/38 |
| | | | | 242/599 |
| D521,990 | S | 5/2006 | Richter | |
| 7,306,185 | B1 * | 12/2007 | Miller | A47K 10/3836 |
| | | | | 242/592 |
| 8,567,878 | B2 | 10/2013 | Wylie et al. | |
| 2005/0006542 | A1 * | 1/2005 | Henning | F16C 11/10 |
| | | | | 248/274.1 |
| 2006/0231438 | A1 * | 10/2006 | Anderson | A47K 10/22 |
| | | | | 206/394 |
| 2009/0050770 | A1 * | 2/2009 | Perlman | A47K 17/00 |
| | | | | 248/346.3 |

(Continued)

*Primary Examiner* — Tan Le
(74) *Attorney, Agent, or Firm* — Harpman & Harpman

(57) ABSTRACT

A hands free device holder for portable media electronic devices to be used in restrooms. The media device holder provides an articulated bendable support arm extending from an integrated toilet paper tissue roll holder. A universal portable media engagement clamp is adjustable on the support arm's free end, having a resilient engagement clamp fitting that will engage and hold a variety of portable media devices, such as cell phones and tablets, as well as related static items.

5 Claims, 4 Drawing Sheets

(56) References Cited

U.S. PATENT DOCUMENTS

| | | | |
|---|---|---|---|
| 2012/0234963 A1* | 9/2012 | Channel | A47K 10/38 242/560.2 |
| 2013/0161455 A1* | 6/2013 | DeJong | F16M 11/04 248/176.3 |
| 2016/0081209 A1* | 3/2016 | Brewer | H05K 5/0204 248/311.2 |

* cited by examiner

PORTABLE MEDIA HOLDING AND DISPLAY DEVICE

This application claims the benefit of U.S. Provisional Application No. 62/165,439, filed May 22, 2015.

BACKGROUND OF THE INVENTION

1. Technical Field

This device relates to adjustable electronic component holders that offer hands free use thereof. Specifically, portable media holding device for use in bathrooms and restrooms where stable, safe and accessible positioning and placement of the media device is critical.

As people take their media into the restroom, they look for somewhere to place their media that is most accessible to them while they are handling their restroom business. Some people use the counter tops surrounding the sink to set their media on. Some people have tables and shelves in their restrooms to set their media on. Some people do not have anything in their restrooms to support their media and have to set their media on their leg, their now wrinkled up pulled down pants, the floor, the back of the toilet, the edge of an actual sink, and but not limited to their hands. All of these places are compromises for the user of such media because as the media user is engaged in their bathroom business they cannot enjoy their media because of the media placement. Although sinks, sink counter tops, tables, counters, shelves, legs, hands, floor, pulled down pants etc. may be there to inefficiently support a media user's media in the restroom; these sinks, sink tops, counters, shelves etc. are in many cases not in an optimal position for the media user. This in turn reduces the user's ability to enjoy their media while they are doing their business. Furthermore, when a user of said media is using the toilet, commode, bidet etc., they are not in a position to move about and are generally limited to an arm length when finding somewhere to place their media.

For example, if a media user was using the toilet and had a phone on his/her leg while watching a video on the internet. When that media user says went to reach for the toilet paper, the phone would now be vulnerable to fall in the toilet so the media user before hand, if possible, may set their media on the sink counter top while their hands are still free. Now this media user has mostly disengaged from their media as the media is not in a position where the user can efficiently view the phone's screen to view the video. Since the user did not have a dedicated device to hold their media, they were forced to limit their media experience. The example just given clearly demonstrates the need for a device that holds media in a position that does not compromise the user's interaction even when engaging in their bathroom business. In addition to someone benefiting from using the media holder device when using the toilet, this media holding device may benefit someone using the bathroom in general for things such as showering, brushing teeth, putting on makeup etc. as they will now have a dedicated place to hold and position their media rather than setting it on the places listed previously. Thus a unique media holder device has been invented for the purposes of alleviating the user of said compromised media interaction by allowing the media user to place their media on a holder device which is firmly supported by a typical toilet paper holder, which is installed in most bathrooms.

2. Description of Prior Art

As noted, media holder devices have been directed to addressing the problem of individuals taking entertainment and information devices into restrooms. As such, a variety of devices have been created to store and position media devices to allow the users to enjoy the devices while in the bathroom. Such prior art devices can be seen in U.S. Patent Application Publication 2009/0050770, which describes a collapsible bathroom caddy having a boom from which magazine, cell phone and toilet paper holder extend.

U.S. Pat. No. 8,567,878 is directed to a toilet user's rollable desk having a work support desk surface and toilet paper storage on a wheeled platform.

U.S. Pat. No. 5,690,307 claims a vehicle accessory holder with a gooseneck shaft that is secured within a vehicle having a phone mounting platform on its oppositely disposed end.

Finally, an example of related holding devices can be seen in U.S. Design Patent D521,990 on an electronic instrument support system having an adjustable phone holder on the end of an adjustable arm, having a mounting base suction cup.

SUMMARY OF THE INVENTION

An adjustable portable electronic media device holder for use in a bathroom having a resilient clamp positioned on the end of an articulated bendable arm, extending from a modified toilet paper holder. A toilet paper roll holder device mount of the invention provides for holding and dispensing a roll of toilet paper and has a support mount from which the articulated support arm of the media holder extends. The paper roll holder device mount is positioned on a toilet paper holder tube with a media holder articulated arm extending therefrom. An anti-rotation mechanism prevents rotation of the holder device mount and its extending articulated media holder arm, stabilizing the electronic media device positioned on its free end, as noted.

DETAILED DESCRIPTION OF THE INVENTION

Figure 1:
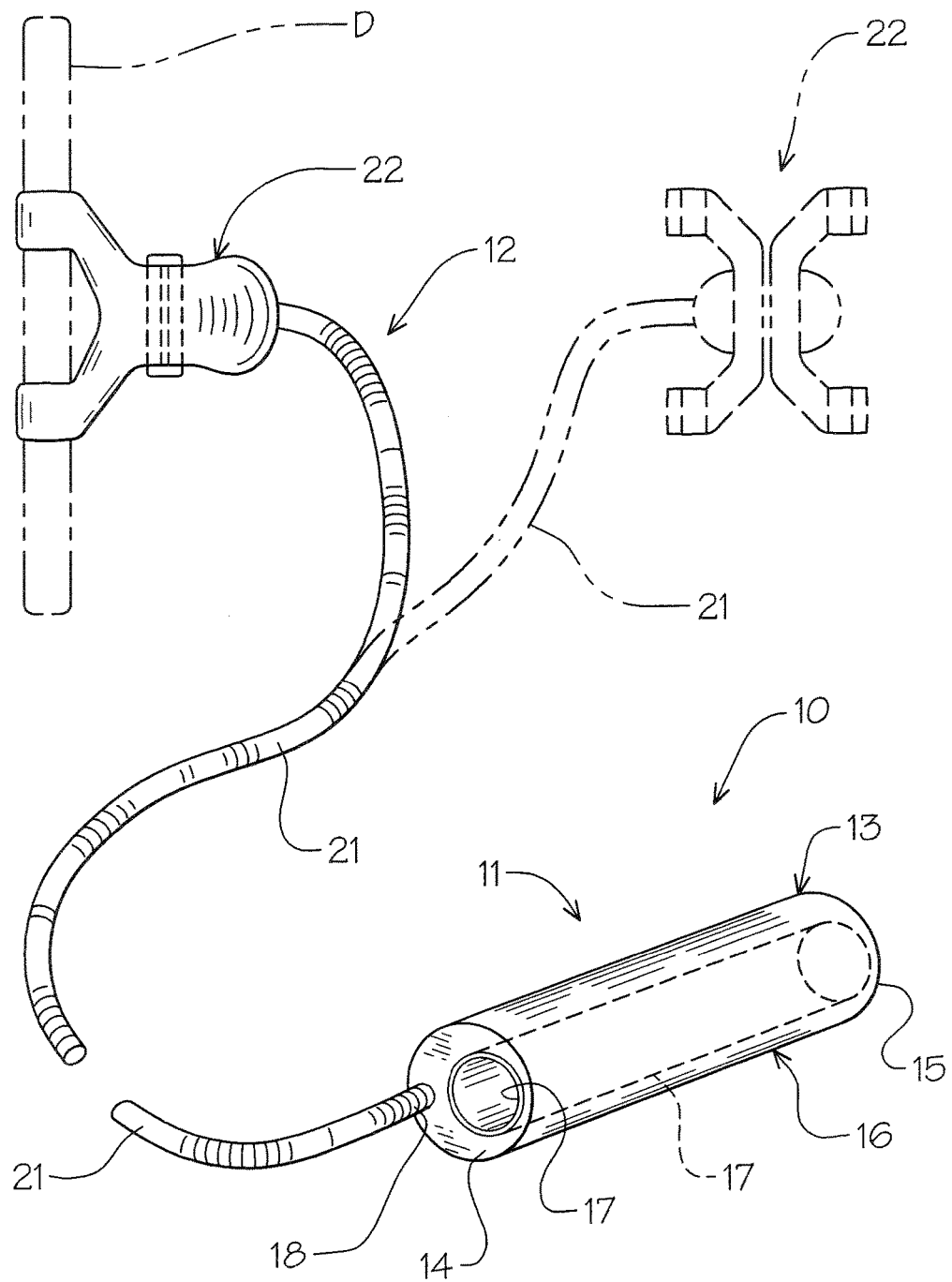
FIG. 1 is a perspective view of the media device holder of the invention.

A portable electronic media device holder 10 of the invention can be seen in FIG. 1 of the drawings, having a toilet paper holder portion 11 and a media device engagement and retainment portion 12. The toilet paper holder portion 11 has a cylindrical body member 13 with oppositely disposed ends 14 and 15 and an exterior cylindrical surface 16. The cylindrical body member 13 has an off center annular opening 17 extending there through. A secondary opening at 18 provides an annular mount adjacent to the opening 17 inwardly from the respective cylinder end 14.

Figure 2:
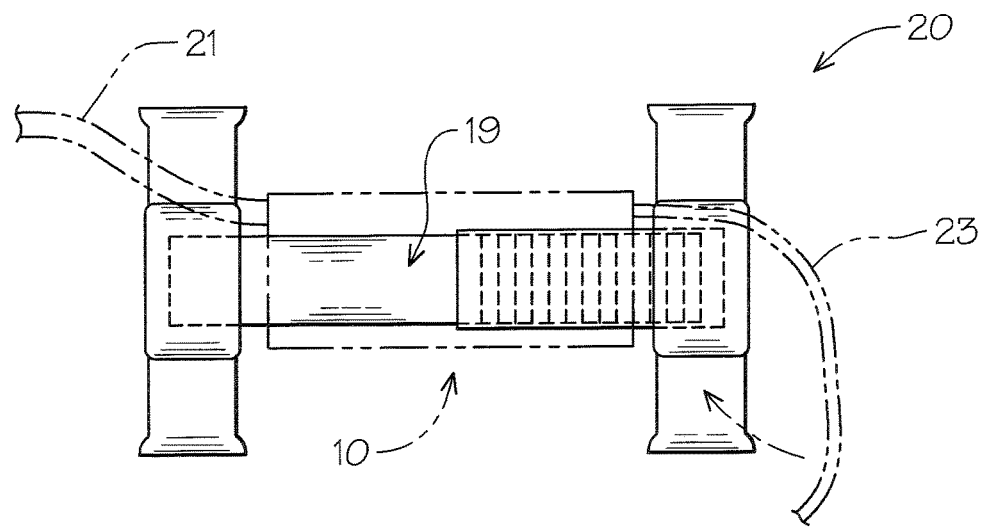
FIG. 2 is a front elevation view of a standard toilet paper holder.
Figure 3:
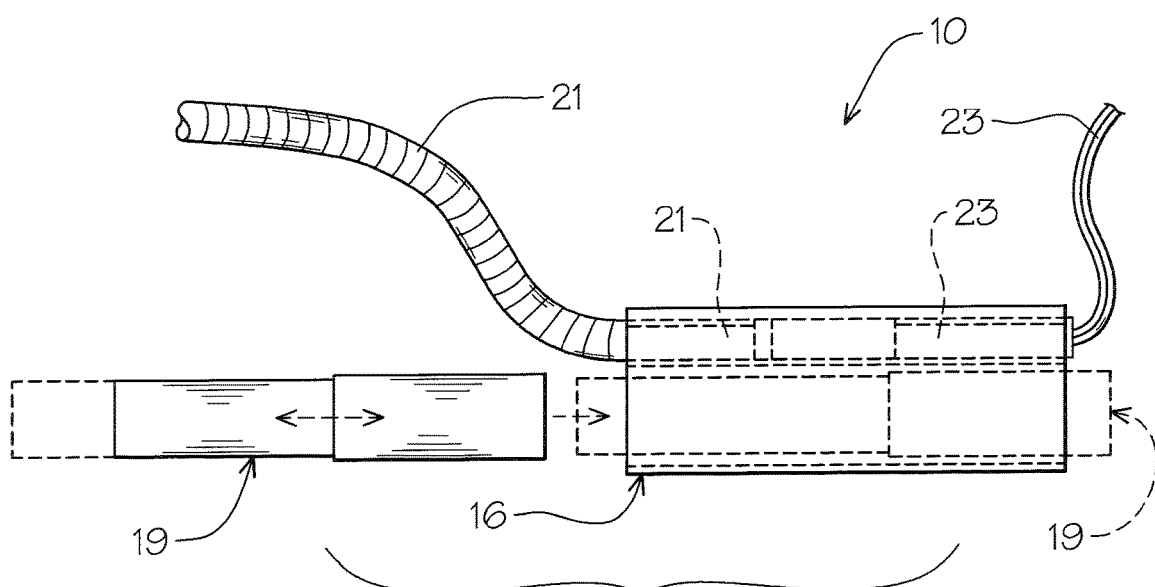
FIG. 3 is a front elevational view of the media device holder toilet paper tube mount, with portions broken away for illustration.
Figure 4:
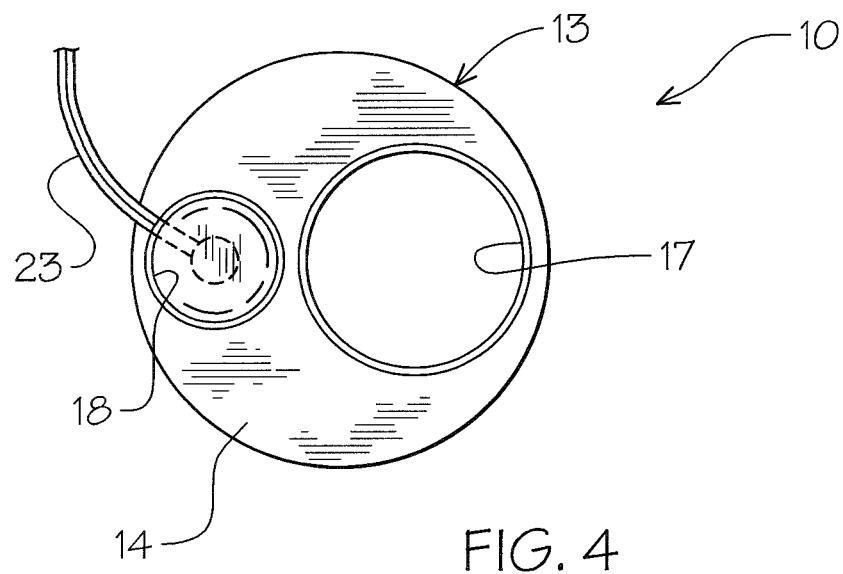
FIG. 4 is an enlarged side elevational view of the tube mount.
Figure 6:
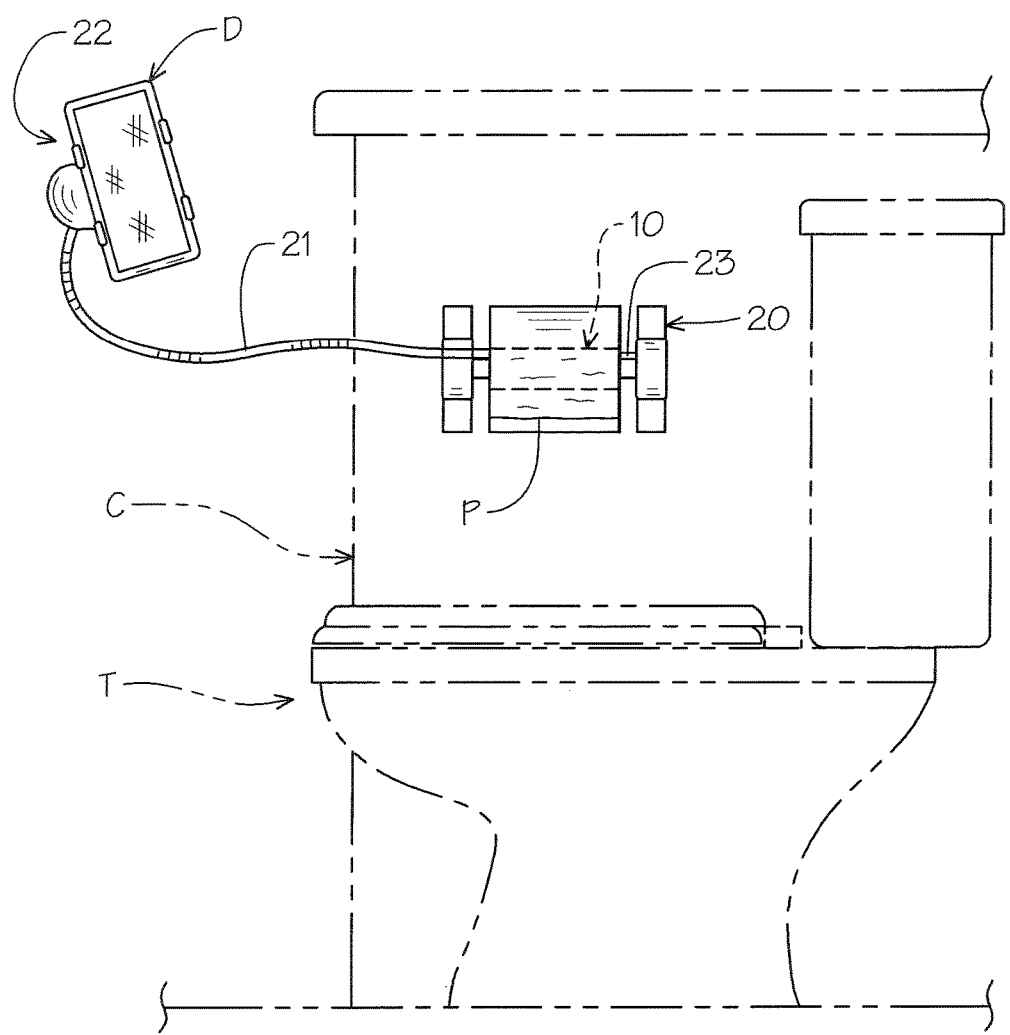
FIG. 6 is a graphic side elevational view of the media device holder installed on a toilet paper holder in a bathroom.

The off center annular opening at 17 is of an interior dimension to accept a spring loaded roller assembly 19 of a typical toilet paper dispenser 20, as seen graphically in FIGS. 2 and 6 of the drawings.

Figure 5:
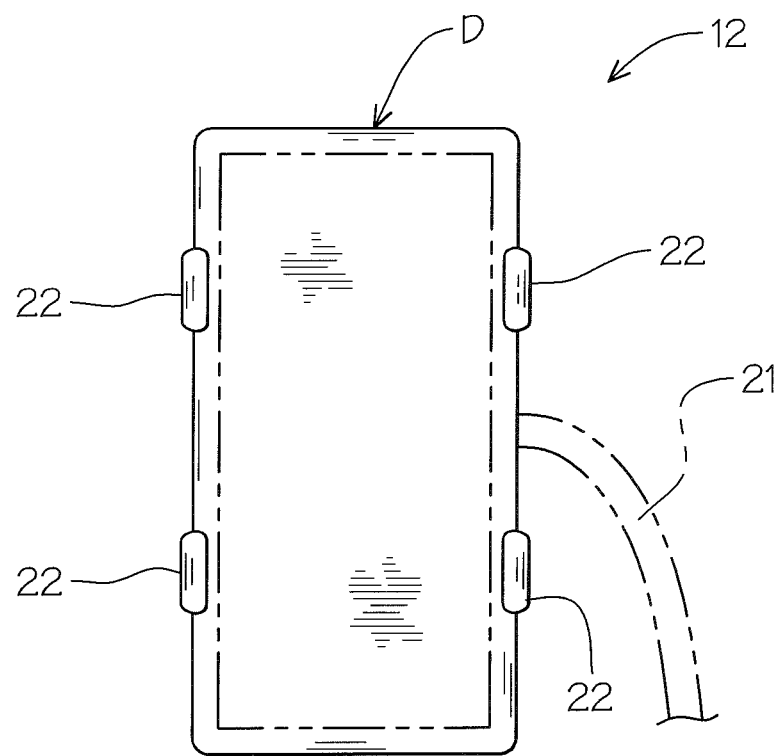
FIG. 5 is a front elevational view of a media device positioned in the holding clamp of the media device holder.

The media device engagement and retainment portion 12 of the invention has an elongated articulated armature 21 that can be bent to a desired position and will retain that position, as is well-known and understood by those skilled in the art. The armature 21 is secured in and extends from the annular mounting opening 18 in the cylindrical body member 13 as hereinbefore described, providing a fixed stable mounting point. A spring urged contoured media device engagement clamp 22 which can be of various designs and size orientation, is secured to the free end of the armature 21 and is of a form and dimension to accommodate a variety of portable electronic media devices, such as but not limited to a cell phone, as seen in FIGS. 1, 5 and 6 of the drawings.

In this example, the cylindrical body member 13 has an anti-rotation fixture 23 extending from the cylindrical body end 15 to restrict its rotation on spring loaded paper holder roller assembly 19 once installed by mechanical engagement therewith.

It will be evident from the above description that in use a roll of toilet paper P can be positioned on the exterior surface 16 of the cylindrical body member 13 from the respective cylindrical body end 15, and therefore be freely rotated thereon for paper dispensing. The cylindrical body member 13 with the toilet paper P positioned thereon can then be secured within the toilet paper dispenser 20 by the insertion and position therein of the roller assembly 19, as will be evident to those skilled within the art. The elongated articulated armature 21 with the media device engagement clamp 22 is then in position and ready for use.

It will be evident that the flexible bendable articulated armature 21 can support a variety of media devices D, such as cell phones, Smart Phones, and tablets and may be configured to hold hand-held gaming devices, papers, and even books. The armature 21 may be of a multi-segmented flexible composition shown and may be bifurcated as seen in FIG. 1 of the drawings in broken lines allowing for a multiple end engagement clamps for use with multiple media devices held at the same time.

Referring back to the anti-rotation fixture 23 it will be seen that in the present form it extends from the cylindrical body 13 as an engagement element and can be registered on the toilet paper dispenser 20 by simple mechanical engagement, or may be of an alternate configuration with integral internal braking mechanism, not shown, to prevent rotation of the cylindrical body in relation to the toilet paper holder 20, providing a stable platform for the armature 21.

It will also be noted that the articulated armature 21 may incorporate a decorative element, such as an exterior representation of a whimsical nature, for example like a snake or other graphic representations.

It will be seen that the contoured spring urge clamp 22 illustrated generally may be of alternate utilitarian design configurations, such as but not limited to multiple clamps, slots, springs, textured grid, suction cup devices and releasable adhesive surfaces that are known and available within the art.

It will thus be seen that a new and useful universal media device holder 10 of the invention has been illustrated and described and that various modifications and changes may be made therein without departing from the spirit of the invention.

Therefore, I claim:

1. A holder for portable electronic media devices for use in restrooms with a toilet paper dispenser comprises in combination,
   a cylinder body member having an annular off center opening there through for positioning on a toilet paper dispenser,
   an articulated semi-rigid and flexible arm extending from one end of said cylindrical body member,
   a media device engagement clamp on the distal end of said arm,
   an elongated anti-rotational fixture extending from one end of said cylindrical body member in oppositely disposed relation to said articulated semi-rigid flexible arm extension.

2. The holder for portable electronic media devices set forth in claim 1 wherein said cylindrical body member has an annular off center mounting bore there through for receiving the proximal end of said articulated semi-rigid flexible arm.

3. The holder for portable electronic media devices set forth in claim 1 wherein said anti-rotational fixture comprises,
   an elongated deformable length of wire for select registration about a portion of said toilet paper dispenser.

4. The holder for portable electronic media devices set forth in claim 1 wherein said articulated semi-rigid and flexible arm extends from an off center bore in one end of said cylindrical body member.

5. The holder for portable electronic media devices set forth in claim 1 wherein one or more articulated semi-rigid and flexible arms extend from off center bore in one end of said cylindrical body member.

* * * * *